United States Patent
Sela

(10) Patent No.: US 9,507,639 B2
(45) Date of Patent: Nov. 29, 2016

(54) PARALLEL COMPUTATION WITH MULTIPLE STORAGE DEVICES

(71) Applicant: Rotem Sela, Haifa (IL)

(72) Inventor: Rotem Sela, Haifa (IL)

(73) Assignee: SanDisk Technologies LLC, Plano, TX (US)

( * ) Notice: Subject to any disclaimer, the term of this patent is extended or adjusted under 35 U.S.C. 154(b) by 124 days.

(21) Appl. No.: 13/658,496

(22) Filed: Oct. 23, 2012

(65) Prior Publication Data

US 2013/0297857 A1    Nov. 7, 2013

Related U.S. Application Data

(60) Provisional application No. 61/643,307, filed on May 6, 2012.

(51) Int. Cl.
| | | |
|---|---|---|
| *G06F 12/00* | (2006.01) | |
| *G06F 9/50* | (2006.01) | |
| *G06F 12/02* | (2006.01) | |
| *G06F 12/06* | (2006.01) | |
| *G06F 12/14* | (2006.01) | |

(52) U.S. Cl.
CPC ......... *G06F 9/5027* (2013.01); *G06F 12/0246* (2013.01); *G06F 12/06* (2013.01); *G06F 12/0623* (2013.01); *G06F 12/1408* (2013.01); *G06F 2212/7201* (2013.01); *G06F 2212/7208* (2013.01)

(58) Field of Classification Search
CPC ............. G06F 9/5094; G06F 12/1072; G06F 2212/7208
See application file for complete search history.

(56) References Cited

U.S. PATENT DOCUMENTS

| | | | |
|---|---|---|---|
| 7,299,266 B2 | 11/2007 | Boyd et al. | |
| 2004/0148482 A1* | 7/2004 | Grundy et al. | 711/167 |
| 2007/0130352 A1 | 6/2007 | Chhabra et al. | |
| 2007/0198856 A1* | 8/2007 | Lee et al. | 713/190 |
| 2008/0140921 A1 | 6/2008 | Sutardja et al. | |
| 2008/0177937 A1* | 7/2008 | Nishihara | G06F 12/0246 711/103 |
| 2009/0164789 A1* | 6/2009 | Carvounas et al. | 713/176 |

(Continued)

FOREIGN PATENT DOCUMENTS

WO    2011/077413 A1    6/2011

OTHER PUBLICATIONS

International Search Report and Written Opinion issued in international application No. PCT/US2013/039201, mailed Jul. 24, 2013 (11 pages).

*Primary Examiner* — Gurtej Bansal
(74) *Attorney, Agent, or Firm* — Brinks Gilson & Lione

(57) ABSTRACT

A method and system are disclosed for allowing access to processing resources of one or more idle memory devices to an active memory device is disclosed, where the idle and active memory devices are associated with a common host. The resources shared may be processing power, for example in the form of using a processor of an idle memory to handle some of the logical-to-physical mapping associated with a host command, or may be other resources such as RAM sharing so that a first memory has expanded RAM capacity. The method may include exchanging tokens with resource sharing abilities, operation codes and associated data relevant to the requested resources.

17 Claims, 11 Drawing Sheets

(56) References Cited

U.S. PATENT DOCUMENTS

2009/0276829 A1  11/2009  Sela et al.
2010/0011164 A1  1/2010  Choi et al.
2011/0023027 A1  1/2011  Kegel et al.
2011/0138100 A1  6/2011  Sinclair
2012/0198128 A1*  8/2012  Van Aken .................... 711/103
2012/0254505 A1*  10/2012  Chishtie ............. G06F 12/0246
                                                          711/103

* cited by examiner

PARALLEL COMPUTATION WITH MULTIPLE STORAGE DEVICES

CROSS-REFERENCE TO RELATED APPLICATIONS

This application claims the benefit of U.S. Provisional Application No. 61/643,307 filed May 6, 2012, the entirety of which is hereby incorporated herein by reference.

TECHNICAL FIELD

This application relates generally to a method and system for managing the storage of data in a data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

Performance of a non-volatile memory device may be limited by the amount of computational power included in the memory device. A limitation on the amount of computational power in a single device may be the amount of heat generated by the device. Some approaches to improving memory device performance may include raising the clock frequency, using a more powerful processor or combining several processors in a single memory device. Problems with these approaches may include excessive power requirements, heat generation and cost increases. Accordingly, an alternative way of improving the performance of a non-volatile memory device is needed.

BRIEF SUMMARY

In order to address the problems and challenges noted above, a system and method for implementing parallel processing among more than one memory device, such as between an embedded and a removable memory device, is disclosed.

According to a first aspect, a storage device is disclosed having a non-volatile memory and a controller in communication with the non-volatile memory that is configured to, upon initialization with the host, provide resource sharing information to a separate memory associated with the host. The controller is further configured to exchange information with the separate memory regarding a state of the memory device and, in response to receiving a host command, request a processing resource from the separate memory to assist with processing. The controller may then process one host command while waiting for a response from the separate memory on the request and then apply the processing result received from the separate memory to a separate host command. The processing request may be for logical-to-physical mapping, RAM sharing or some other memory feature. The memories may be embedded and removable, or separate removable memories that are associated with a common host. In alternative embodiments, the storage device may encrypt and decrypt data sent via token to the separate memory.

Other embodiments are disclosed, and each of the embodiments can be used alone or together in combination. The embodiments will now be described with reference to the attached drawings.

DETAILED DESCRIPTION

Figure 1:
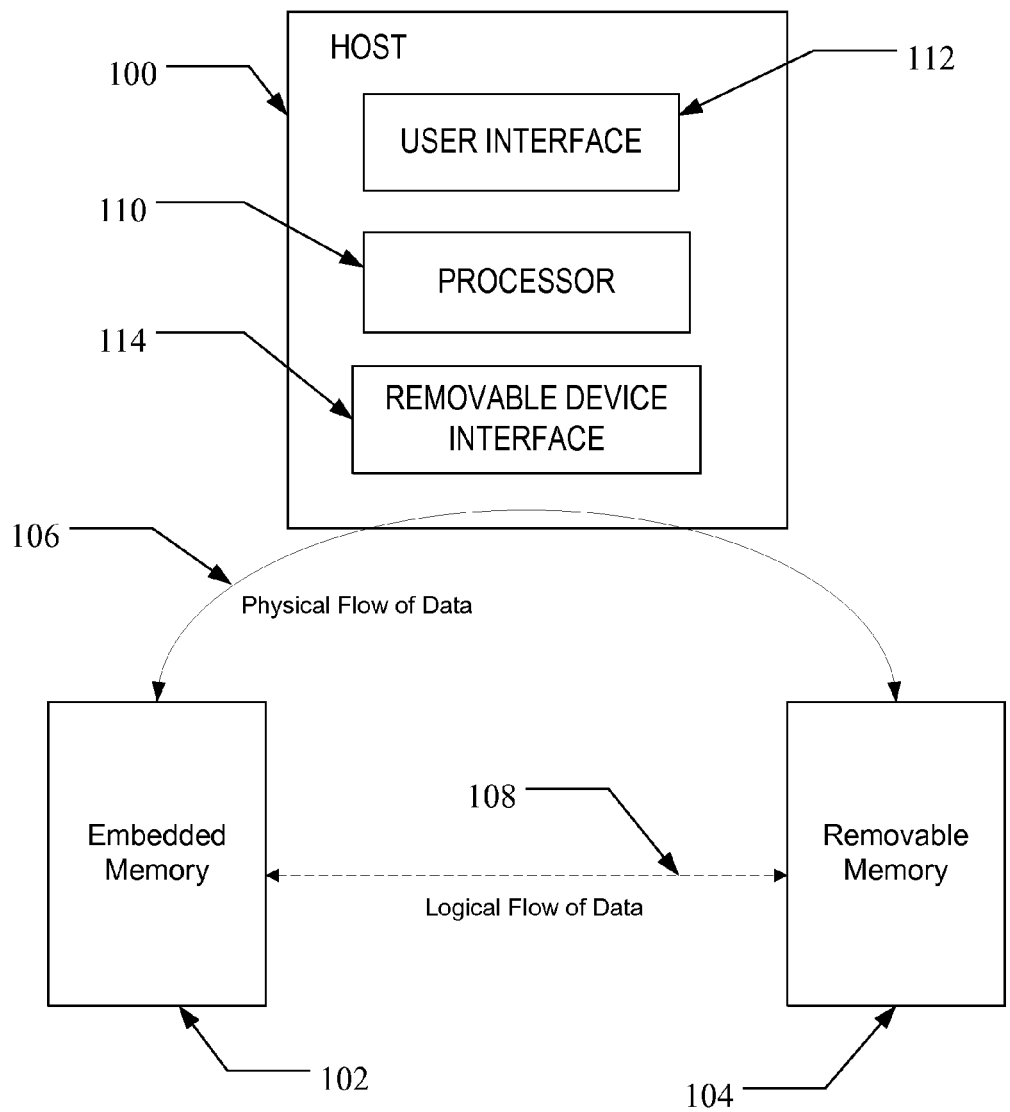
FIG. 1 illustrates a block diagram of an embedded memory and removable memory associated with a host sharing memory processing and other resources according to one embodiment.

As shown in FIG. 1, in some systems a host may be connected with more than one memory device. For example, in a system where a host 100 is a mobile phone, the host 100 may include embedded flash memory 102 and also be connected to a removable flash memory device 104 such as a SD card or other available removable flash storage device form factor. Typically, a host 100 is working with one memory device 102, 104 while the other one is idle. In order to improve the performance of one of these memory devices, a method and system for utilizing the computation power of the idle memory device for the benefit of the active memory device is described below.

In order to take advantage of an idle memory device's processing power, the active memory device (in this example the embedded flash memory 102) needs to communicate information and instructions to the idle memory device (in this example the removable flash memory device 104). In FIG. 1, a physical communication path 106 is illustrated where data flows to and from the embedded flash memory 102 to the removable flash memory device 104 via the host 100 as an intermediary/conduit. A logical communication path 108 is also disclosed illustrating the data path that is set up between the embedded and removable memory devices 102, 104. Because the memory devices 102, 104 are only using the host as a conduit or hub, and because other topologies may include a ring topology or other arrangement that permits direct physical communication between the memory devices (i.e. without a need for the host 100 to establish the connection or act as an intermediary) the logical communication path 108 may also represent the physical data path in other implementations.

The host system 100 is configured to store data into, and retrieve data from, storage devices 102, 104. The host system 100 may be any of a number of fixed or portable data handling devices, such as a personal computer, a mobile telephone, a personal digital assistant (PDA), or the like. The host system 100 includes the embedded memory 102, which may be a discrete integrated circuit or die, and communicates with the removable storage device 104, such as a solid state disk (SSD) or flash memory card that is removably connected to the host system 100 through a mechanical and electrical connector. The host system 100 may include a processor 110, a user interface 112, and one or more removable device interfaces 114. An embedded memory interface may also be incorporated in the host along with the embedded memory 102.

Figure 2:
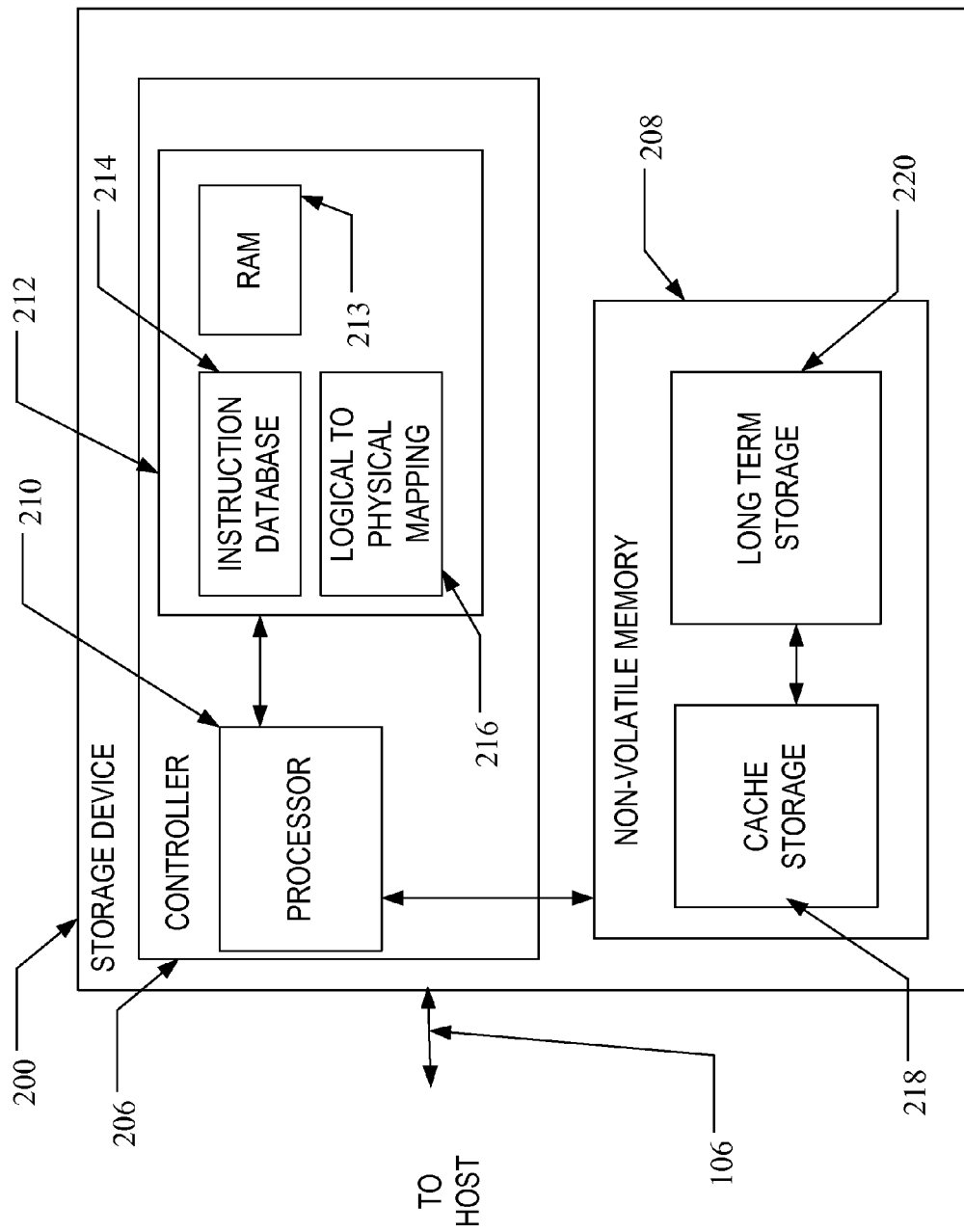
FIG. 2 illustrates a block diagram of a memory suitable for use as an embedded memory or a removable memory in the example of FIG. 1.

Referring to FIG. 2, an example storage device 200 suitable for use for each of the embedded or removable storage devices 102, 104 is illustrated. The configuration of the embedded and removable storage devices may be the same or different, and the arrangement of FIG. 2 is simply provided as one example of a suitable arrangement that each of these memories 102, 104 may take. The storage device 200 contains a controller 206 and a memory 208. The controller 206 includes a processor 210 and a controller memory 212. The processor 210 may comprise a microprocessor, a microcontroller, an application specific integrated circuit (ASIC), a field programmable gate array, a logical digital circuit, or other now known or later developed logical processing capability. The controller memory 212 may include volatile memory such as random access memory (RAM) 213 and/or non-volatile memory, processor executable instructions 214 for handling memory management, and logical to physical mapping tables 216.

The storage device 200 may include functions for memory management. In operation, the processor 210 may execute memory management instructions (which may be resident in instruction database 214) for operation of the memory management functions. The memory management functions may control the assignment of the one or more portions of the memory within storage device 200.

The storage device 200 contains non-volatile memory 208 that includes cells that may be arranged as a short term storage array (referred to herein as cache storage) 218 and a long term storage array 220. The cache storage 218 and long term storage 220 may be made up of the same type of flash memory cell or different types of flash memory cells. For example, the cache storage 218 may be configured in a single level cell (SLC) type of flash configuration having a one bit per cell capacity while the long term storage 220 may consist of a multi-level cell (MLC) type flash memory configuration having two or more bit per cell capacity to take advantage of the higher write speed of SLC flash and the higher density of MLC flash. Different combinations of flash memory types are also contemplated for the cache storage 218 and long term storage 220.

Figure 3:
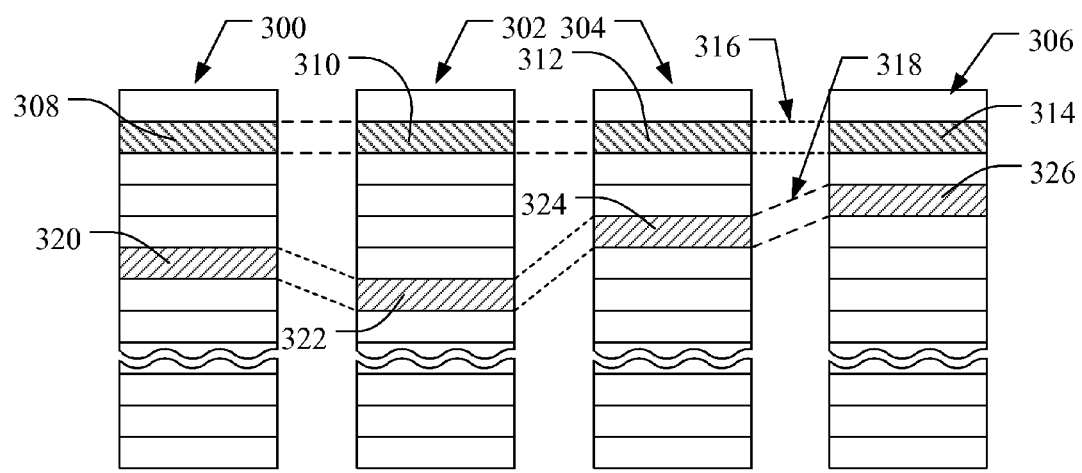
FIG. 3 illustrates an example physical memory organization of the memories in FIGS. 1-2.

Referring to FIG. 3, the flash memory 208 in each of the embedded and removable memory devices 102, 104 may be arranged in blocks of memory cells. In the example of FIG. 3, four planes or sub-arrays 300, 302, 304 and 306 memory cells are shown that may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
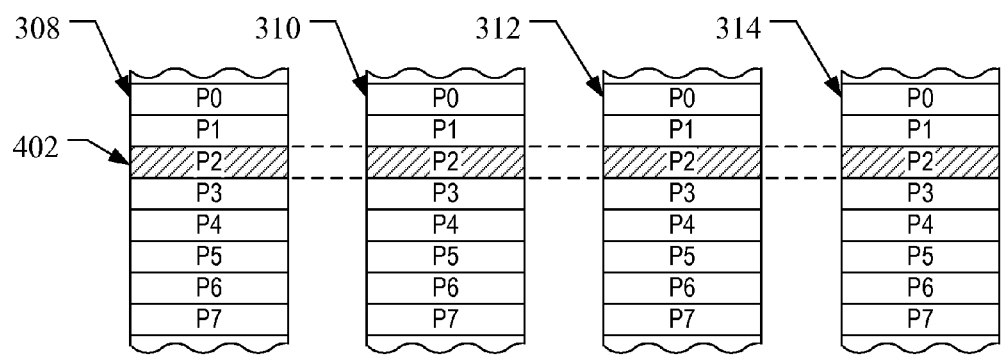
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming and reading within a block, containing the minimum amount of data that are programmed or read at one time. A metapage 402 is illustrated in FIG. 3 as formed of one physical page for each of the four blocks 308, 310, 312 and 314. The metapage 402 includes the page P2 in each of the four blocks but the pages of a metapage need not necessarily have the same relative position within each of the blocks. A metapage is the maximum unit of programming. The blocks disclosed in FIGS. 3-4 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 104 where the data is physically stored.

Referring now to FIGS. 5A-5E, a method of utilizing the processing power of a second memory device to enhance that of a first memory in communication with a common host is described. Upon initialization, each of the embedded memory 102 and removable memory 104 inform the host 100 of their abilities to share processing with a sharing protocol common to both. In one implementation, the host 100 is configured to recognize the sharing protocol capability information received from each memory 102, 104 and to then pass on subsequent information from one memory to the other. This initialization may be triggered as part of a power-up sequence when the embedded and removable memories 102, 104 are initialized, or may be triggered by the connection or disconnection of a memory device from the host. The initialization information may include device manufacturer information, device and/or software version, a sharing standard identifier, or other information that allows the memory devices and/or host to recognize the functional capabilities described herein. The host and memory devices may each be configured with a protocol, such as the universal flash storage (UFS) protocol published by JEDEC of Arlington, Va., that has been modified to recognize and act on the sharing capabilities of memory devices.

Figure 5A:
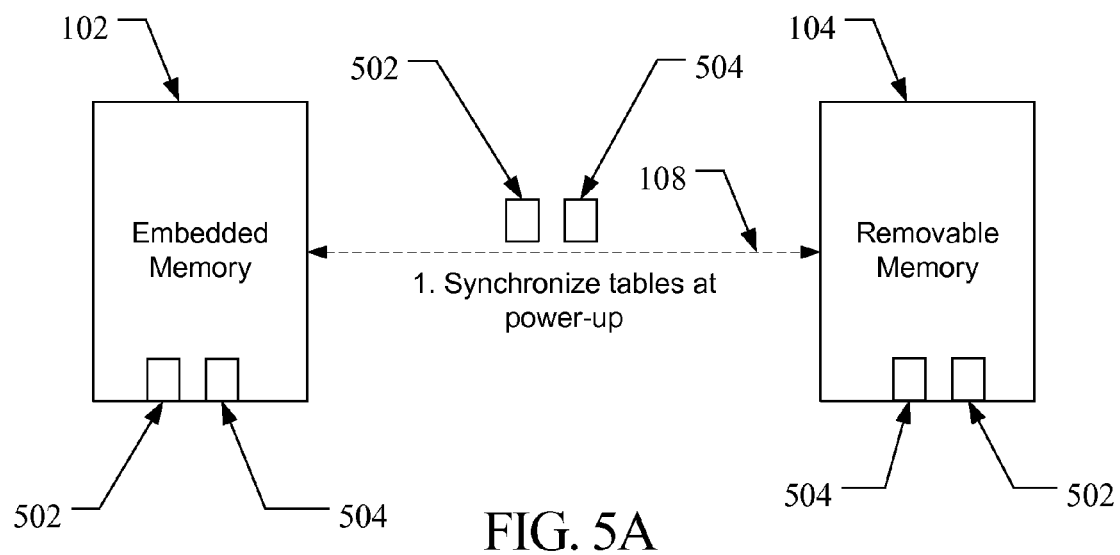
FIGS. 5A-5E show steps in a process of sharing processing between an embedded memory and a removable memory associated with a common host device according to one preferred implementation.

As shown in in FIG. 5A, assuming each memory 102, 104 has the capability to share resources with another memory, the memories may exchange tokens 502, 504 at initialization with each the other. The token 502 generated by the embedded memory 102 being transmitted and stored on the removable memory 104 and the token 504 generated at the removable memory 104 being transmitted to and stored on the embedded memory 102. The exchange is shown along the logical path 108 rather than the physical path 106 for simplicity of illustration. The tokens 502, 504 may contain information regarding the memory in which they were generated, such as one or more of manufacturer information, version of the sharing protocol or other information indicative of the amount and type of functions it can share with another memory device. Additionally, the tokens may contain information on a current state of the memory in which the token was generated. For example, the token may contain back end tables, such as the current logical-to-physical mapping tables, or other tables, for the memory. If other capabilities are supported, such as the ability for one memory to mirror or act as the RAM for the other, then the contents of the RAM memory may also be sent. For purposes of the example of FIGS. 5A-5E, it is assumed that the capabilities of the memories 102, 104 for resource sharing is processor sharing to assist with logical-to-physical mapping such that the embedded memory may use the processing power of the removable memory to calculate where data received at the embedded memory should be physically mapped into the embedded memory.

Figure 5B:
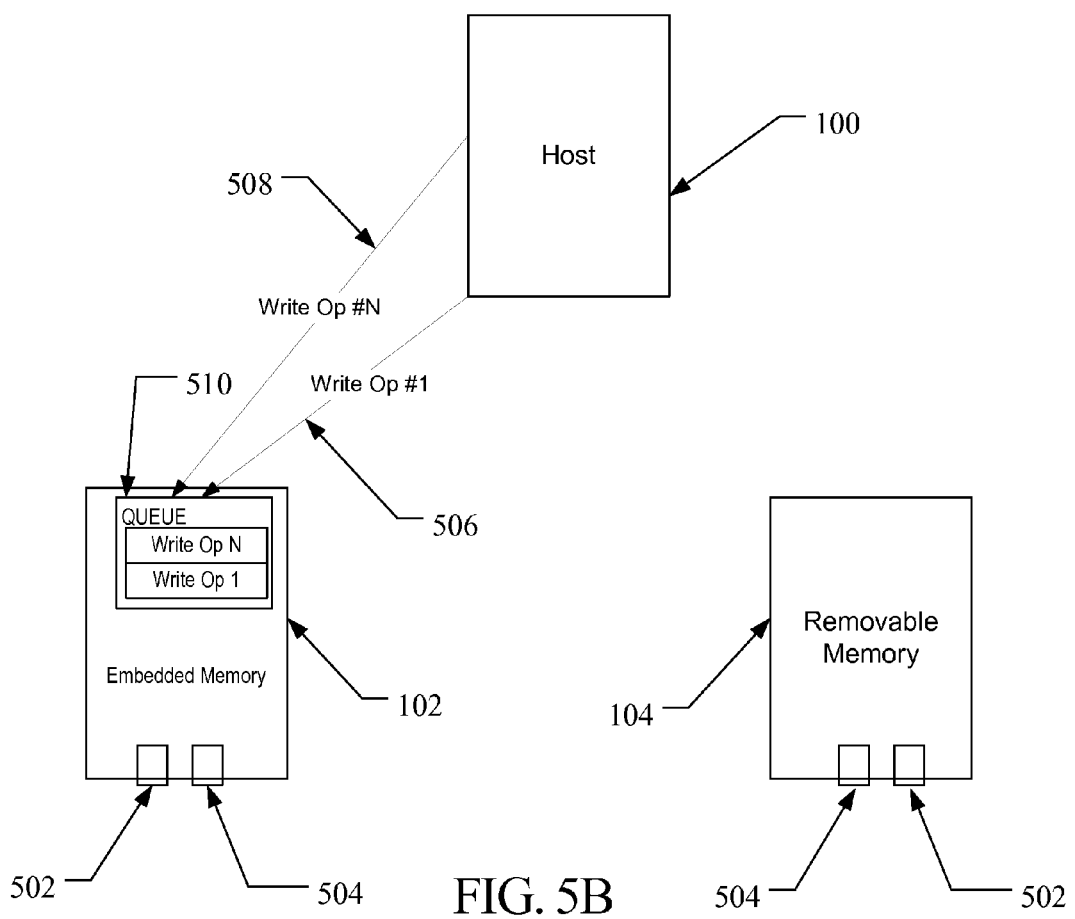

Referring now to FIG. 5B, after the exchange of tokens 502, 504 and synchronization of tables or other data that was carried in the tokens, data write commands are received from the host 100. Assuming that a UFS protocol is implemented, the host 100 may implement a write operation by sending the embedded memory 102 a write command, for example in the form of a command descriptor block (CDB) containing the logical block address and size of the data to be written. The host may send a first write command 506 followed by a subsequent write command 508, to the embedded memory 102. The embedded memory needs to determine where to physically map the data for each command that the host identified by logical address and size. The calculations necessary for determining how to map the logical addresses to physical locations takes a certain amount of processing time that can lead to delays in actually accepting and writing the data associated with the write commands. Because the write commands may come more quickly than the embedded memory 102 can immediately handle, the commands are placed in a queue 510 by the embedded memory 102.

Figure 5C:
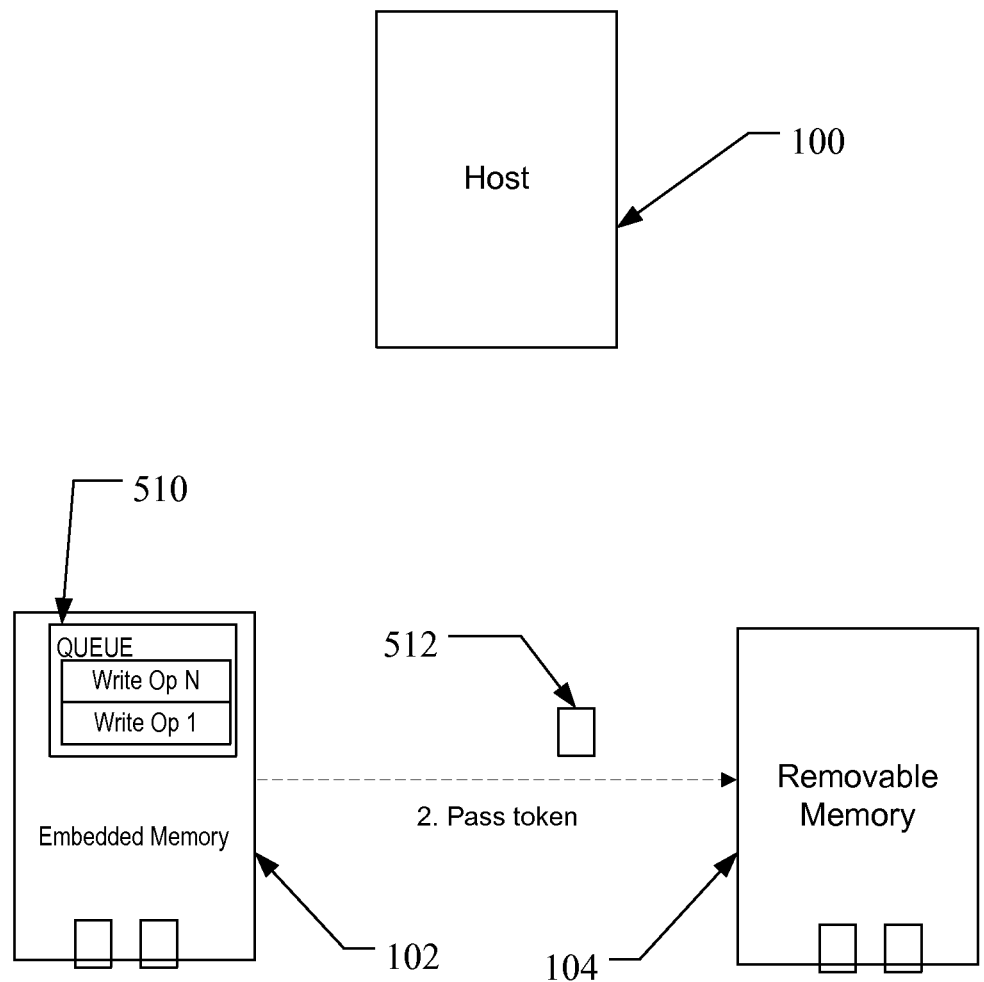

Referring now to FIG. 5C, the embedded memory 102 can utilize the removable memory 104 to calculate the logical-to-physical mapping of the data to be received in the second command (Write Op N) by passing a second token 512 to the removable memory 104 with the necessary information on the state of the memory in the embedded memory and the LBA range that is to be written. In one embodiment, the second token 512 consists of a collection of all write commands (e.g. CDBs) that have been received by the embedded memory, with the embedded memory associating flags with those write commands that the embedded device would like the removable memory to process. In other embodiments, tokens 512 containing individual write commands, along with a flag indicating whether or not the write command is to be processed by the removable memory device, may be sent by the embedded device. Although the embedded device may only want the help of the removable device to process specific write commands, in one embodiment all of the write commands are sent to the removable memory from the embedded memory, with appropriate indication of which ones to act on, so that the removable memory has the complete and up-to-date picture of the state and status of the various tables in the embedded memory.

Figure 5D:
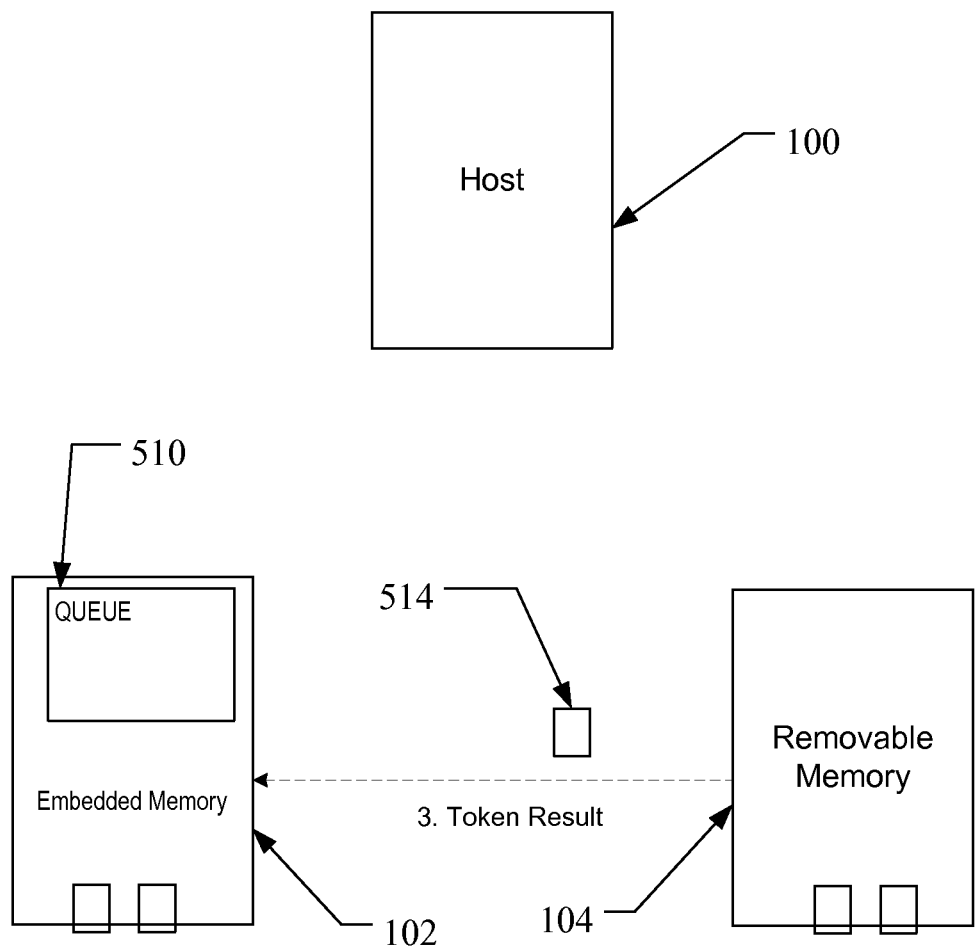
Figure 5E:
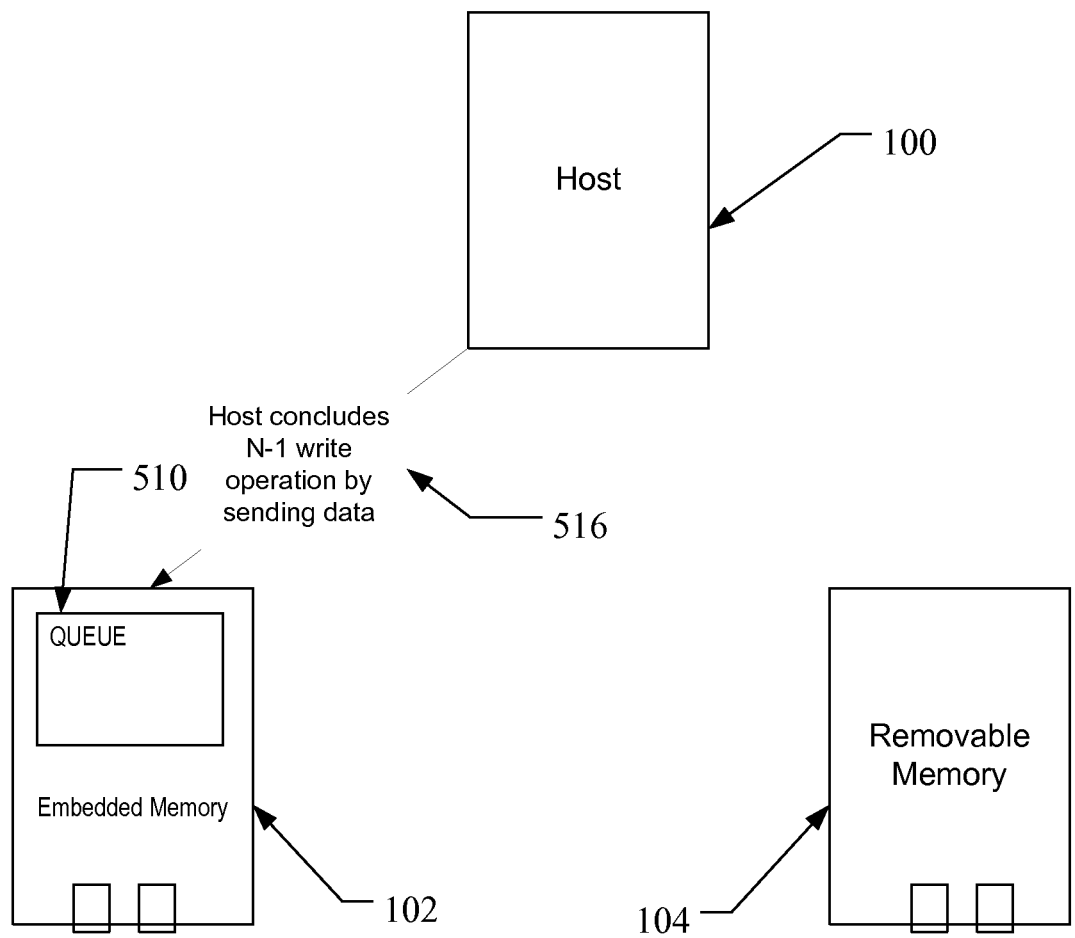

While the embedded memory 102 is handling the first write command and writing the data associated with the first write command, the processor of the removable memory 104 may be calculating/mapping the locations for the data the host will be sending with the next command in the queue. As shown in FIG. 5D, the removable memory 104 returns a result token 514 to the embedded memory 102 containing the mapping information that the embedded memory can use for the requested write command. As shown in FIG. 5E, the embedded memory can then receive the data 516 for the command that the removable memory already calculated the physical locations for. This process may be repeated for each write command in the queue 510 so that the embedded memory 102 may concentrate on writing the data while the removable memory 104 calculates the physical locations for the incoming data. In this manner, the embedded memory may improve its performance and avoid timing out or delaying the data from the host 100.

Other forms of performance enhancement, by exporting/sharing processing or memory functions to the removable memory are contemplated. As mentioned previously, the embedded memory 102 may require assistance with expanding its RAM capability, in whole or in part, by utilizing the RAM of the idle removable memory 104 during write operations directed by the host to the embedded memory. In this scenario, the RAM functions of the embedded memory may be outsourced to the removable memory via token communications and sharing of RAM status information over the logical path 108 between the memories 102, 104. It is contemplated that multiple functions, such as the logical to physical mapping and RAM sharing, may be concurrently or simultaneously utilized by the embedded memory and removable memory in other embodiments.

Figure 6:
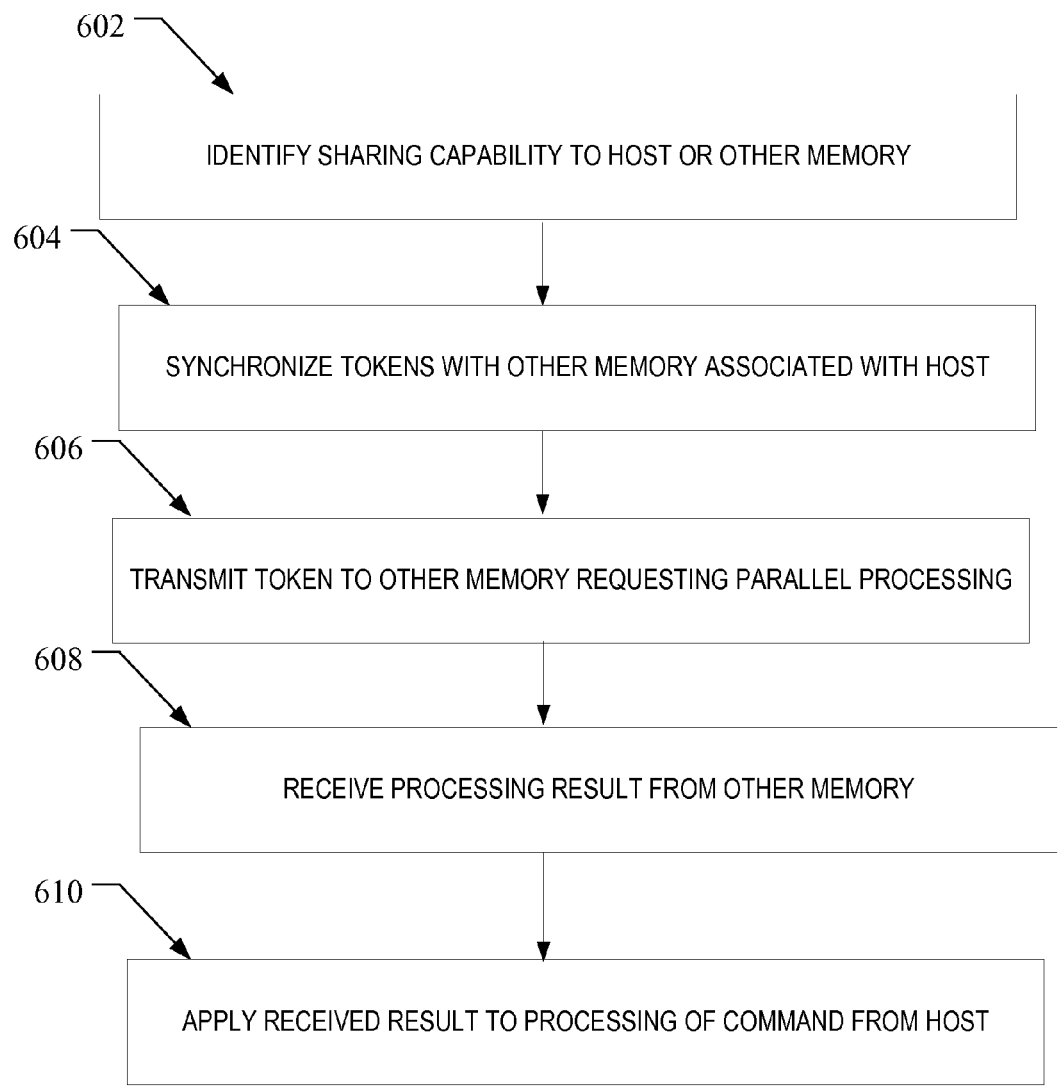
FIG. 6 is a flow chart of an embodiment of a method of one memory utilizing the resources of another memory to improve its performance in responding to a command or commands from a common host.

FIG. 6 illustrates a flow chart of the general steps that may be used in the resource sharing and parallel processing memories of FIG. 1, such as the logical-to-physical mapping example provided in FIG. 5. Upon initialization and recognition of the memories by the host, information on the processing and resource sharing capabilities or protocols are provided to the host or directly to the other memory (at 602). Each of the memories, embedded or removable, are thus informed of the availability or lack thereof of resource and processing sharing abilities of the other memories. Each memory transmits a token to the other compatible memory identifying its current state (at 604). When additional processing or other resource is desired by a memory, it sends a token to one or more other memories with information necessary for the receiving memory to carry out the request (at 606). The requesting memory then receives the requested result and applies that result to its activities in handling the host requirements (e.g. the write command or other host command for which assistance was requested) (at steps 608, 610).

In order to prepare the embedded and removable memories for sharing the various functions, the status for each device may be exchanged at initialization for all the possible functions that could be shared, regardless of whether the devices end up sharing those particular functions. Thus the one or more tokens generated by each memory 102, 104 may include significantly more information than is utilized for the particular session. Additionally, it is contemplated that, even for memory devices and hosts that are compatible with some form of processor or other resource sharing as described herein, that there may be different versions of the sharing protocol contained in each device, such that the system of host and connected memories will default to the lowest common version of the sharing protocol if different versions are present. For example, if a version 1.0 and 2.0 exist, where 1.0 is an earlier and less capable version than version 2.0, version 1.0 may be utilized by a device with version 2.0 capability if one of the other devices is only capable of version 1.0 functionality for the sharing protocol and functions described herein.

In other embodiments, the memory devices that share processing or other features may be two removable memory devices in communication with a common host rather than an embedded and a removable memory. The second, or idle, memory need not even be a non-volatile memory at all in other embodiments. The idle device may instead be any of a number of peripheral devices that include the ability to process commands and possess other types of memory, such as RAM, that may be shared. In one alternative embodiment, the second memory may be the host itself, where the embedded memory requests assistance in processing or memory sharing from the host processor.

Figure 7:
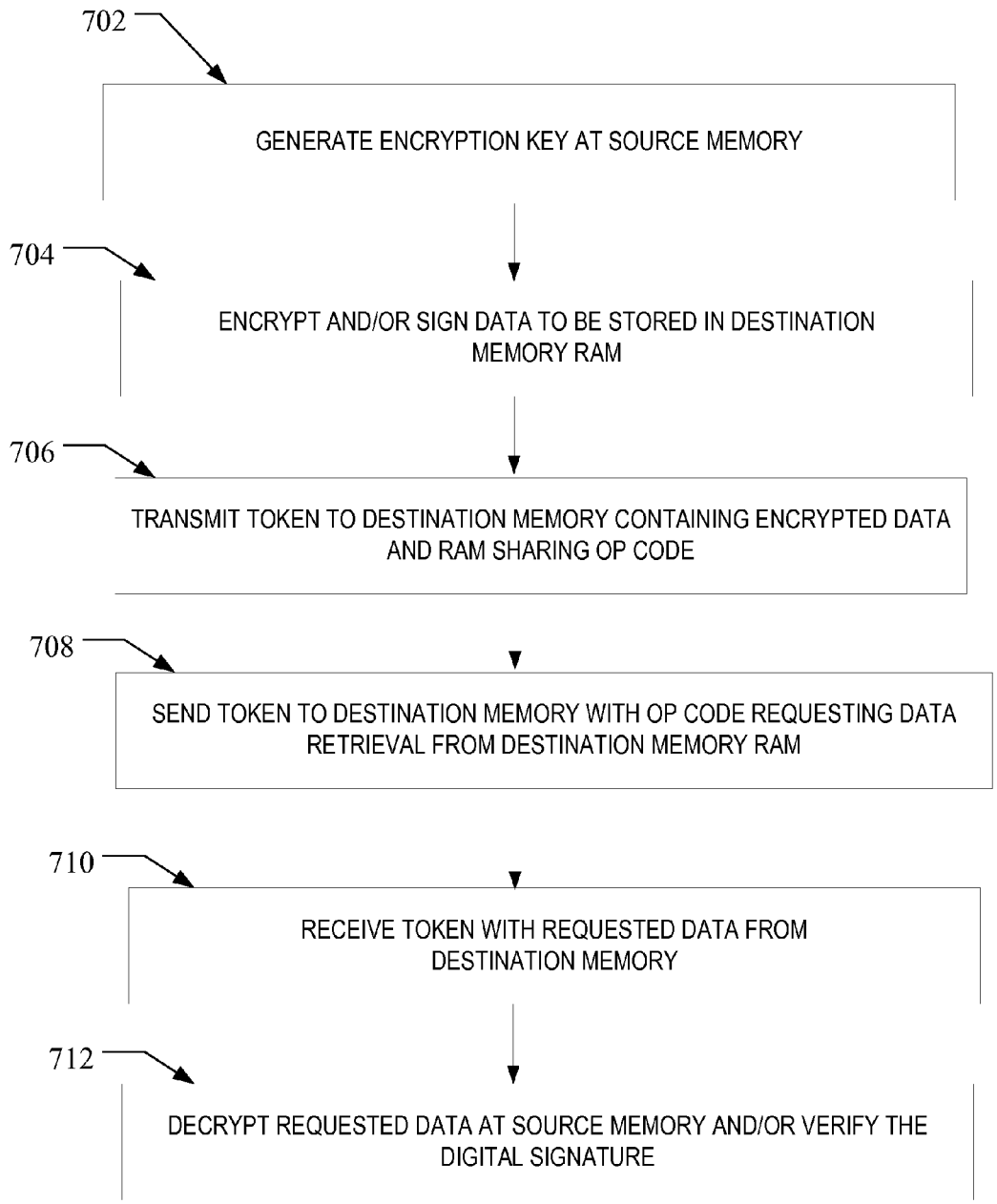
FIG. 7 is a flow chart of an embodiment of a method of one memory engaging in RAM sharing with another memory and incorporating an encryption procedure to protect the data.

Referring to FIG. 7, an embodiment of a method of memory devices engaging in RAM sharing is illustrated. The memory device needing to use RAM of another memory device is referred to in FIG. 7 as the source memory and the memory device providing RAM services to the source memory is referred to as the destination memory. After the memory devices (embedded and peripheral to the host or both peripheral) have identified their sharing capabilities to the host or other memory device via an exchange of tokens, such as described with respect to FIGS. 6 (at 602 and 604), a memory device may request RAM sharing assistance from the other memory device. Although the data that the source memory wishes to have stored in RAM at the destination memory need not be protected, the embodiment of FIG. 7 shows one encryption process that may be utilized to protect access to and the integrity of the shared data from the source memory.

The controller or processor of the source memory may generate an encryption key internally (at 702) using any of a number of secret keys or certificates and any of a number of encryption techniques. Suitable encryption algorithms include, but are not limited to, CMAC (cipher-based MAC or message authentication code) or hash-based encryption algorithms. Using the generated encryption key, the processor of the source memory may encrypt and/or sign the data that the source memory wishes to store in the RAM of the destination memory (at 704). At this stage, the source memory may transmit a token to the destination memory, either via the host, or over a direct connection as noted below, containing the encrypted data and a RAM sharing operation code to alert the destination memory of what it is being asked to do (at 706). When the source memory wants to retrieve some or all of the data is has asked the destination memory to store in RAM, a subsequent token with an operation code the destination memory will recognize as an instruction to send back the encrypted data is sent from the source to the destination memory (at 708). The destination memory will retrieve the encrypted data from its RAM and send it back to the source memory in another token (at 710). Finally, the source memory may decrypt and authenticate the data from the received token (at 712). In instances where the digital signature fails (cannot be verified), the source memory will not accept the data and may transmit a signal to the host indicating that the data is corrupted.

Although described in the context of a RAM sharing feature, this or other techniques for encrypting and/or signing of data or other information may be used in other parallel computing or resource sharing operations engaged in by the memory devices. In other embodiments, the parallel processing or resource sharing may take place between more than two memory devices, such that a first memory device could ask for and receive processing or resource sharing services from more than one other memory device concurrently.

Figure 8:
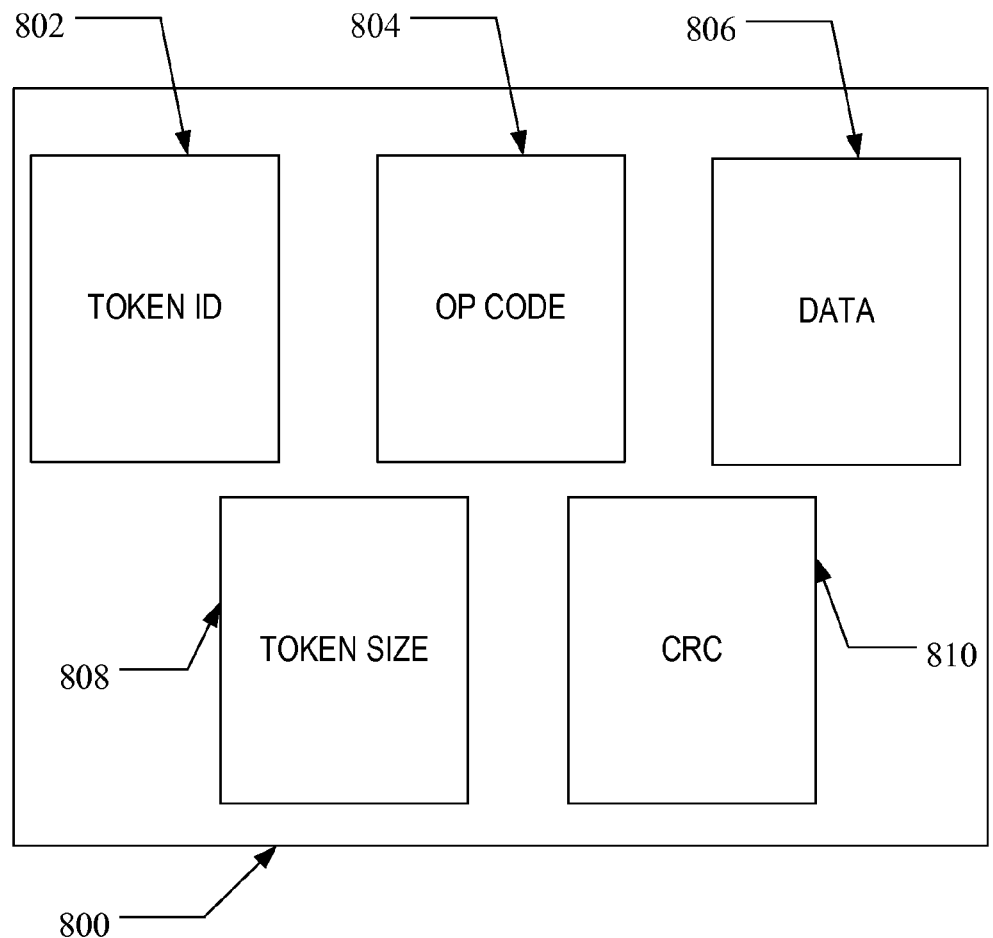
FIG. 8 illustrates one embodiment of a logical structure for a token usable to implement the processes of FIG. 6 or 7.

Referring now to FIG. 8, one example of a logical structure of a token 800 usable by a memory device, whether embedded or peripheral to a host, is shown. The token 800 may include a transaction or token ID 802 that identifies the particular transaction and/or token and transaction that the token 800 represents. An operation code (op code) 804 identifies the purpose of the token 800, for example op codes for initialization (e.g. identifying to the other memory or host upon power up the capabilities available from the memory device that generated the token), requesting processor assistance, RAM sharing, and other separate processes or stages within a particular process may be placed in this field of the token 800. The available op codes would include different numbers or other identifiers for all of the processing types available. A set of op codes for RAM sharing may include a code for requesting the RAM sharing feature, a code for later requesting return of data that was previously sent with the RAM sharing request token, and so on. The token 800 may also include a field for the data 806 that is sent back and forth between memories. The data 806 may be contents of RAM being shared, a list of tables or other information relevant to a particular op code provided in the token 800. A token size 808 denotes the amount of data that is in the token 800 so that the controller of the memory or processor of the host is aware of how much to look for in the token. Finally, cyclic redundancy code (CRC) information 810 may be included to help correct, or at least identify, corruption of data being transmitted between source and destination. In one embodiment, there may also be tokens sent or exchanged in acknowledgement of receipt or to confirm completion of a process. In other embodiments no acknowledgement tokens may be used. The token ID 802 may serve as a transaction identifier so that the memory devices may be certain which operation or sequence of tokens applies to particular data or other tokens.

The memory device requesting a processing resource from another memory, and the memory from which the processing resource is requested, may each generate tokens 800 having this general format.

Also, as noted previously, the connection topology may be a hub-type connection where the different memories need to separately communicate their sharing abilities with the host and the host, as a hub, then mediates communications between the two memory devices. In another implementation, a ring-type topology may be utilized where the memory devices are associated with a common host but are nodes capable of direct physical communication rather than only through the host. In yet other embodiments, a manufacturer of embedded memory may enhance the attractiveness of use of its removable memory devices for hosts having the manufacturer's embedded memory by configuring both the manufacturer's embedded and removable memories with the ability to recognize and utilize the sharing protocols and capabilities described herein. Similarly, the potential advantages of enhanced processing between removable devices having similar sharing capabilities are apparent. In other implementations, it is contemplated that the sharing capability, for example parallel processing, may be further spread over multiple additional currently idle memories attached to a common host where a first of the memories may call upon more than one other idle memory to further share processing requests for the first memory.

An advantage of the disclosed method and system is that compatible memories may communicate at power up, or during some other initialization procedure, to exchange tokens to allow the active memory to utilize a processing resource of the idle memory, for example RAM storage or processing power of the idle memory. In contrast to typical situations where multiple separate memory devices are connected with a host and the processing power of only one active memory device at a time is available, the processing power of multiple memory devices may be used to increase the performance of the active memory device. The use of separate memory devices associated with the same host allows not only for the improvement of performance in terms of speed, but may reduce the concentration of heat that might otherwise be generated if processing were enhanced in a single memory device attached to a host It is therefore intended that the foregoing detailed description be regarded as illustrative rather than limiting, and that it be understood that it is the following claims, including all equivalents, that are intended to define the spirit and scope of this invention.

What is claimed is:

1. A memory device in communication with a host, the memory device comprising:
    a non-volatile memory; and
    a processor in communication with the non-volatile memory, the processor configured to:
        upon receipt of an initialization trigger from the host, provide resource sharing information to a separate memory device associated with the host;
        transmit information regarding a state of the memory device to the separate memory device, the separate memory device comprising a second processor in communication with a second non-volatile memory and the information comprising a current logical-to-physical mapping table of the memory device;
        in response to receiving a plurality of host commands directed to writing data to the memory device:
            generate a command queue identifying the plurality of host commands;
            request logical-to-physical mapping processing from the second processor of the separate memory device for determining where in the non-volatile memory of the memory device to map data associated with one of the plurality of host commands in the command queue, while the processor writes data associated with another of the plurality of host commands; and
            apply a logical-to-physical mapping processing result received from the separate memory device to the one of the plurality of host commands in the command queue, wherein the memory device writes data associated with the host command to physical locations in the non-volatile memory of the memory device determined by the separate memory device.

2. The memory device of claim 1, wherein the initialization trigger comprises an initial power-up of the processor.

3. The memory device of claim 1, wherein the processor is further configured to transmit write command information received from the host to the separate memory device and is configured to mark a selection of the write command information for processing by the separate memory device.

4. The memory device of claim 1, wherein the non-volatile memory comprises flash memory embedded in the host and the separate memory device comprises a removable flash memory device.

5. The memory device of claim 1, wherein the non-volatile memory comprises a first removable flash memory device in communication with the host and the separate memory device comprises a second removable flash memory device in communication with the host.

6. The memory device of claim 1, wherein the processor is further configured to transmit a request to use random access memory (RAM) of the separate memory device to expand a RAM capability of the memory device during a write operation directed to the memory device by the host.

7. The memory device of claim 6, wherein the processor is configured to generate and transmit encrypted data associated with the request to use random access memory.

8. A memory device in communication with a host, the memory device comprising:
    a non-volatile memory; and
    a processor in communication with the non-volatile memory, the processor configured to:
        upon detecting an initialization trigger from the host, provide resource sharing information to a separate peripheral device associated with the host and receive resource sharing information from the separate peripheral device;
        based on the received resource sharing information, and in response to receiving host commands directed to storing data in the non-volatile memory of the memory device, request a processing resource by generating and transmitting a token to the separate peripheral device, the token comprising a listing of the received host commands and identifiers generated by the processor identifying which of the received commands the memory device requests the separate peripheral device to assist with; and
        write data associated with a first received host command directed to storing data on the memory device while the separate peripheral device is processing a different received host command directed to storing data on the memory device.

9. The memory device of claim 8, wherein the processor is configured to request the processing resource by requesting from the separate peripheral device logical-to-physical mapping calculations associated with the host commands directed to storing data on the memory device.

10. The memory device of claim 8, wherein the processor is configured to request the processing resource by requesting to use random access memory (RAM) of the separate peripheral device for processing the host commands directed to storing data on the memory device.

11. A method of implementing parallel computation with multiple memory devices comprising:
    in a first memory device in communication with a host, the first memory device having non-volatile memory and a processor in communication with the non-volatile memory, the processor:
        receiving a token generated at a second memory device in communication with the host, the second memory device having a second processor and a second non-volatile memory, the token identifying functions the second memory device has available to share with the first memory device;
        receiving a plurality of host write commands directed to writing data to the non-volatile memory of the first memory device;
        generating and transmitting a second token to the second memory device, the second token comprising a queue of the plurality of host write commands and identifying information on which of the plurality of host write commands in the queue the first memory requests assistance from the second memory device to calculate logical-to-physical mapping;

writing data associated with a first of the plurality of host write commands to the non-volatile memory while the second memory device is calculating a physical location in the non-volatile memory for data associated with a second one of the plurality of host write commands;

receiving the calculated physical location from the second memory device;

and writing data associated with the second of the plurality of host write commands to the calculated physical location in the non-volatile memory received from the second memory device.

12. The method of claim 11, wherein receiving the token generated at the second memory device comprises receiving the token via the host in response to an initial power-up of a processor of the second memory device.

13. The method of claim 11, wherein the first memory device is an embedded flash memory device and the second memory device is a removable flash memory device.

14. The method of claim 13, wherein the second token further comprises a request from the first memory device to use random access memory (RAM) of the second memory device.

15. The method of claim 14, wherein transmitting the second token comprises the first memory device generating an encryption key, encrypting data to be stored in RAM of the second memory device and transmitting the second token to the second memory device including the encrypted data and a RAM sharing request.

16. The method of claim 15, further comprising the first memory device sending a request to retrieve the encrypted data from the second memory.

17. The method of claim 16, wherein sending a request to retrieve the encrypted data comprises the first memory device transmitting a further token including a request to retrieve the encrypted data from the second memory device, receiving a subsequent token from the second memory device in response to the further token including the request to retrieve, and decrypting the encrypted data included in the subsequent token.

* * * * *